US009413953B2

(12) United States Patent
Maeda

(10) Patent No.: US 9,413,953 B2
(45) Date of Patent: Aug. 9, 2016

(54) IMAGE CAPTURING APPARATUS AND METHOD FOR CONTROLLING THE SAME

(71) Applicant: CANON KABUSHIKI KAISHA, Tokyo (JP)

(72) Inventor: Masamine Maeda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 662 days.

(21) Appl. No.: 13/760,358

(22) Filed: Feb. 6, 2013

(65) Prior Publication Data
US 2013/0222533 A1 Aug. 29, 2013

(30) Foreign Application Priority Data

Feb. 23, 2012 (JP) .................................. 2012-037799

(51) Int. Cl.
*H04N 5/232* (2006.01)
*H04N 5/235* (2006.01)

(52) U.S. Cl.
CPC ......... *H04N 5/23238* (2013.01); *H04N 5/2355* (2013.01)

(58) Field of Classification Search
CPC ............ H04N 5/23238; H04N 5/2355; H04N 5/3415; H04N 5/355–5/3359; G06T 3/4038; G06T 5/007–5/009; G06T 2200/32; G06T 2207/20208; G03B 37/00–37/06
USPC ................... 348/36–39, 218.1; 382/284, 294; 396/322, 335–340
See application file for complete search history.

(56) References Cited

U.S. PATENT DOCUMENTS

| 7,634,157 | B1* | 12/2009 | Richards | G01J 3/02 382/284 |
| 8,913,153 | B2* | 12/2014 | Li | H04N 5/2353 348/222.1 |
| 9,258,453 | B2* | 2/2016 | Kato | H04N 1/3871 |
| 2004/0100565 | A1* | 5/2004 | Chen | G06T 3/4038 348/229.1 |
| 2007/0242141 | A1* | 10/2007 | Ciurea | G02B 5/205 348/239 |
| 2012/0287294 | A1* | 11/2012 | Kaizu | H04N 5/2355 348/208.4 |
| 2013/0208138 | A1* | 8/2013 | Li | H04N 5/2353 348/229.1 |

FOREIGN PATENT DOCUMENTS

JP 2004-180308 6/2004

* cited by examiner

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An image capturing apparatus that couples a plurality of images so as to generate a composite image, comprises an image capturing unit which captures images of an object; a determination unit which determines, for each of a plurality of areas into which light receiving portions of the image capturing unit are separated, an exposure condition under which the image capturing unit is exposed; a first composition unit which couples to one another, area by area, the plurality of images that were shot under the exposure condition determined for each area by the determination unit, so as to generate a first plurality of composite images; and a second composition unit which composes the first plurality of composite images generated by the first composition unit so as to generate a single second composite image that has an extended dynamic range.

8 Claims, 11 Drawing Sheets

FIG. 3
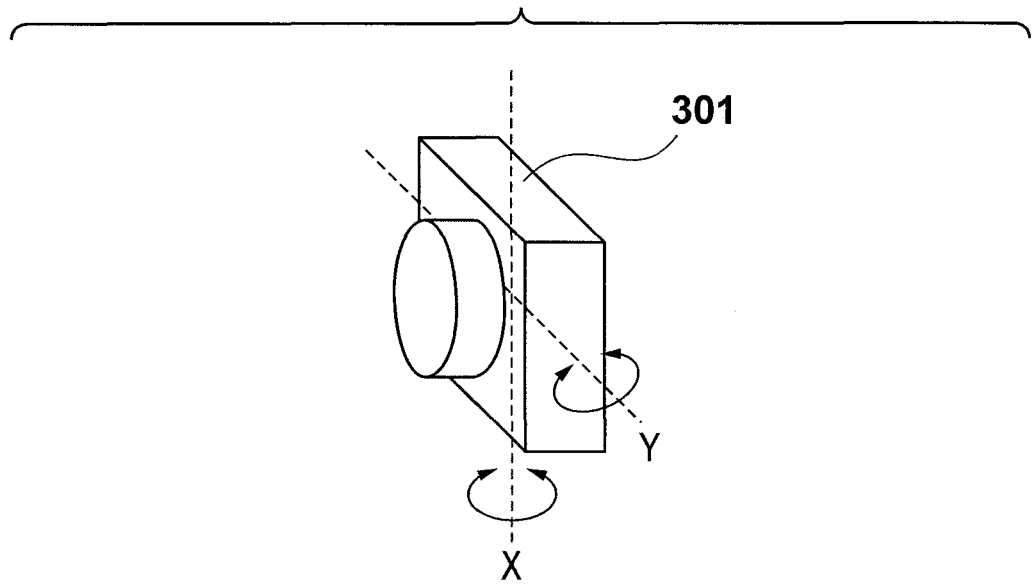
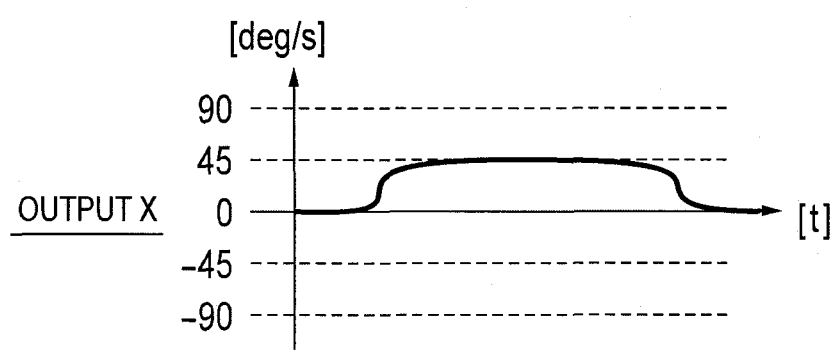
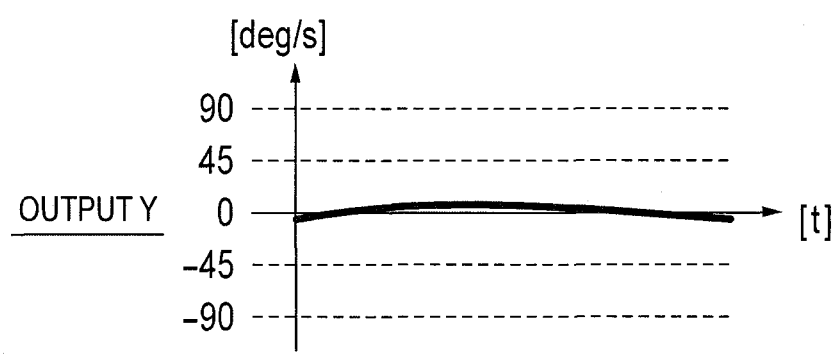

IMAGE CAPTURING APPARATUS AND METHOD FOR CONTROLLING THE SAME

BACKGROUND OF THE INVENTION

1. Field of the Invention

The present invention relates to an image capturing technique that generates a composite image by coupling a plurality of images.

2. Description of the Related Art

There has been a method for generating a panoramic image by shooting a plurality of images, while changing an angle of a camera, and smoothly coupling right and left overlapping parts of each image to corresponding parts of other images using image processing.

There has also been a method for generating an image that has a wide dynamic range by shooting, while changing an exposure condition, a plurality of images including an image having little highlight-detail loss and an image having little shadow-detail loss, and composing them. The method is referred to as a high dynamic range (HDR) composition. Japanese Patent Laid-Open No. 2004-180308 discloses a technique for generating a panoramic image, in which one image having no highlight-detail loss and no shadow-detail loss is generated using the above-mentioned HDR composition, while an area is changed and shooting and composition are performed similarly so as to generate other images, and these HDR images are composed into the panoramic image.

However, since in the method disclosed in Japanese Patent Laid-Open No. 2004-180308, a plurality of images are shot in the same angle, it is thus necessary to fix the camera body on a tripod stand or the like when shooting a plurality of images, and to repeat shooting of a plurality of images and adjustment of a camera angle, requiring a complicated procedure.

Further, although an image that has a wide dynamic range is generated for each angle and brightness of each image is adjusted when it is coupled to another image, a difference in brightness level might remain at the border between the images coupled to each other since they are shot under different exposure conditions.

SUMMARY OF THE INVENTION

The present invention has been made in consideration of the aforementioned problems, and realizes a technique that enables to shoot, with a simple operation, panoramic images each having a wide dynamic range and to obtain a panoramic image in which no difference in brightness level is made at the border between the images.

In order to solve the aforementioned problems, the present invention provides an image capturing apparatus that couples a plurality of images so as to generate a composite image, comprising: an image capturing unit configured to capture images of an object; a determination unit configured determine, for each of a plurality of areas into which light receiving portions of the image capturing unit are separated, an exposure condition under which the image capturing unit is exposed; a first composition unit configured to couple to one another, area by area, the plurality of images that were shot by the image capturing unit under the exposure condition determined for each area by the determination unit, so as to generate a first plurality of composite images; and a second composition unit configured to compose the first plurality of composite images generated by the first composition unit so as to generate a single second composite image that has an extended dynamic range.

In order to solve the aforementioned problems, the present invention provides a method for controlling an image capturing apparatus that couples a plurality of images so as to generate a composite image, the apparatus comprising an image capturing unit for capturing images of an object, the method comprising: a determination step of determining, for each of a plurality of areas into which light receiving portions of the image capturing unit are separated, an exposure condition under which the image capturing unit is exposed; a first composition step of coupling to one another, area by area, the plurality of images that were shot by the image capturing unit under the exposure condition determined for each area in the determination step, so as to generate a first plurality of composite images; and a second composition step of composing the first plurality of composite images generated in the first composition step so as to generate a single second composite image that has an extended dynamic range.

According to the present invention, it is possible to shoot, with a simple operation, panoramic images each having a wide dynamic range and to obtain a panoramic image in which no difference in brightness level is made at the border between the images.

Further features of the present invention will become apparent from the following description of exemplary embodiments (with reference to the attached drawings).

BRIEF DESCRIPTION OF THE DRAWINGS

FIG. 3 is a diagram illustrating an operation of an angular velocity sensor of the digital camera of the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes First Embodiment according to the present invention.

Apparatus Configuration

Schematic configuration and functionality of an image capturing apparatus according to the embodiment of the present invention will now be described with reference to FIG. 1.

Figure 1:
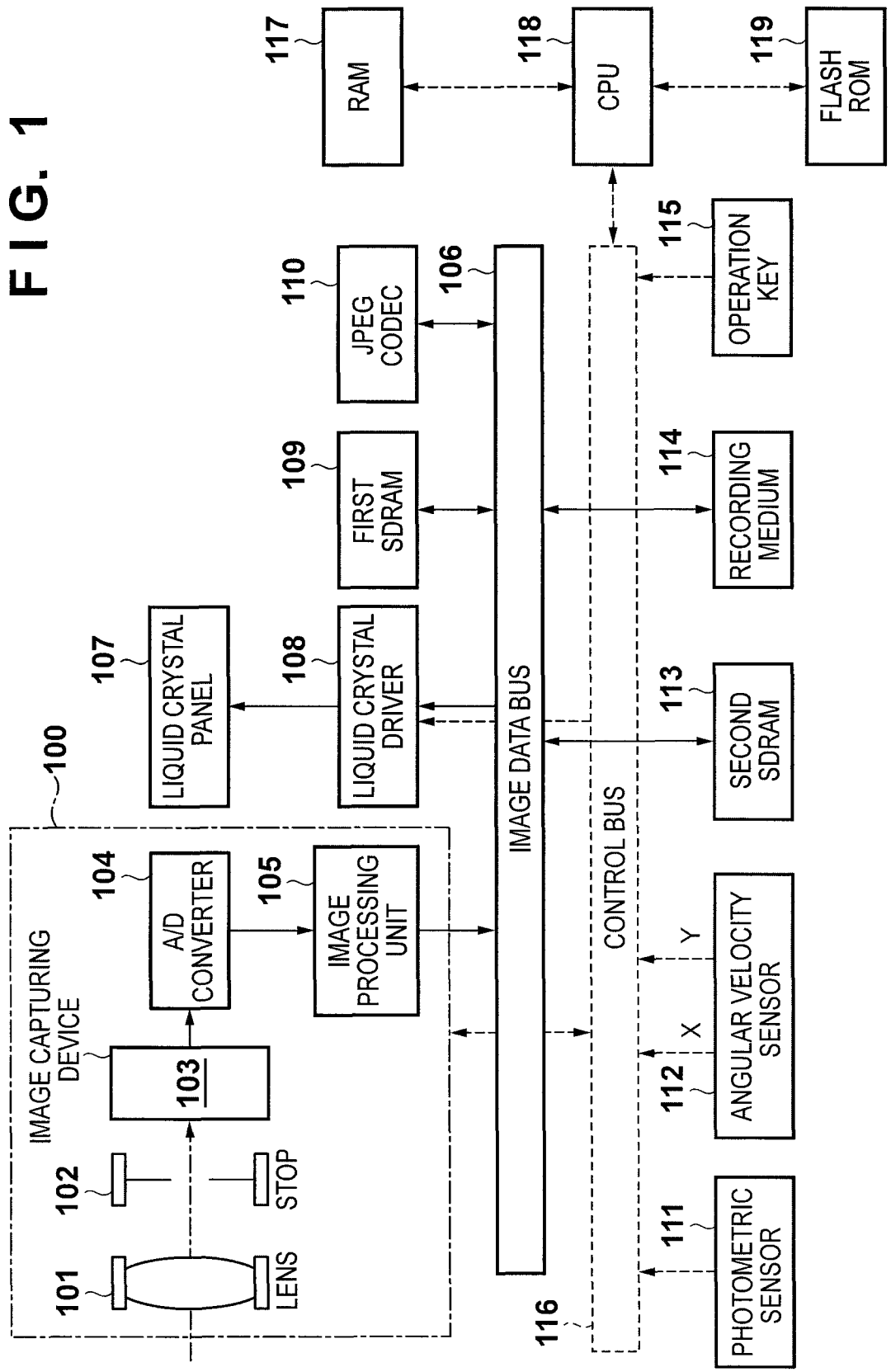
FIG. 1 is a block diagram illustrating a configuration of a digital camera according to an embodiment of the present invention.

In FIG. 1, a shooting lens 101 acquires an object image and forms the acquired object image on an image capture screen of an image capturing device 103. A stop 102 limits an amount of light of the object image that enters from the shooting lens 101 to a predetermined amount. According to the digital camera of the present embodiment, a zoom position is fixed, in a panorama shooting mode that will described later, at a focal length of the shooting lens 101 that corresponds to 28 mm in 35 mm film equivalent focal length. The object image formed on the image capturing device 103 is converted into an electric signal by a photoelectric conversion element that constitutes a CMOS image sensor or the like, and the electric signal is converted by an A/D converter 104 into a digital signal, which is then output to an image processing unit 105. The image processing unit 105 subjects the image signal that was input to a gamma correction, a white balance correction, noise reduction processing, and the like and outputs the image signal as uncompressed image data to an image data bus 106.

A photometric sensor 111 detects the luminance distribution within the range of the image capture screen, and outputs EV value data to a control bus 116. An angular velocity sensor 112 detects an angular velocity, which is generated when a photographer changes an angle of the camera body, for each of the X (yaw) and Y (pitch) directions that are perpendicular to an optical axis of the camera, and outputs respective data of the detected angular velocities to the control bus 116 via two X and Y channels. A liquid crystal panel 107 is a display unit for displaying images and various types of information.

A first SDRAM 109 accumulates uncompressed image data of a plurality of frames, and provides a memory space that is a work area where panoramic composition and HDR composition, which will be described later, are performed. A codec 110 compresses and encodes, as a still image, the uncompressed image data that was subjected to the composition processing in the first SDRAM 109, so as to generate JPEG or RAW data. JPEG is a format for recording 8-bit gradation data, and has reproduction compatibility with ordinary devices, and RAW is a format for recording 14 bit gradation data that was not subjected to the image processing by the image processing unit 105 but encoded by a lossless compression method, and has reproduction compatibility with only specific devices.

A second SDRAM 113 writes or reads the JPEG data generated by the codec 110 to or from a recording medium 114, and provides a buffer memory space where the recording speed of the recording medium 114 is adjusted. The second SDRAM 113 also serves as a memory (video memory) for storing data of an image to be displayed. A liquid crystal driver 108 converts the data of an image to be displayed, which is stored in the second SDRAM 113, to a liquid crystal display signal, and supplies the liquid crystal display signal to the liquid crystal panel 107. Thus, the data of an image to be displayed, which was written to the second SDRAM 113, is displayed on the liquid crystal panel 107 via the liquid crystal driver 108.

The digital signals, which were A/D converted by the A/D converter 104 and accumulated in the second SDRAM 113, are converted into the liquid crystal display signals by the liquid crystal driver 108, and sequentially transferred to the liquid crystal panel 107 so as to be displayed there. The liquid crystal panel 107 thus functions as an electronic view finder capable of displaying of through images. The recording medium 114 is a memory card that is constituted by a NAND type flash memory or the like, and is removably mounted on the camera body. The recording medium 114 records the JPEG or RAW data, which is generated in accordance with a FAT (File Allocation Table) file system that is compatible with PCs, that is, the JPEG or RAW data will be recognized as a disc drive when the recording medium 114 is connected to a PC.

Operation keys 115 are switches of various types for receiving various types of operations from the photographer, and include a shutter button for instructing to shoot a still image, and a mode switch for selecting one of a panorama mode in which panoramic shooting is performed and a general shooting mode in which general still image shooting is performed. The control bus 116 is a signal path through which control signals are communicated between the blocks, namely, control signals are transmitted from a CPU 118 to the blocks and response signals from the blocks and data signals from the sensors are transmitted to the CPU 118. A flash ROM 119 is a nonvolatile memory that is electrically erasable and recordable, and stores constants for operating the CPU 118, programs, and the like. In this context, "programs" refers to programs for executing a flowchart that will be described later in the present embodiment. The CPU 118 controls the entire camera. By executing the program stored in the flash ROM 119 that will be described later, the CPU 118 realizes processes that will be described later in the present embodiment. Reference numeral 117 denotes a system memory that is a RAM. The RAM 117 deploys the constants and variables for operating the CPU 118, the program that was read out from the flash ROM 119, or the like. The CPU 118 also controls the liquid crystal driver 108 or the like in order to control display.

Figure 2:
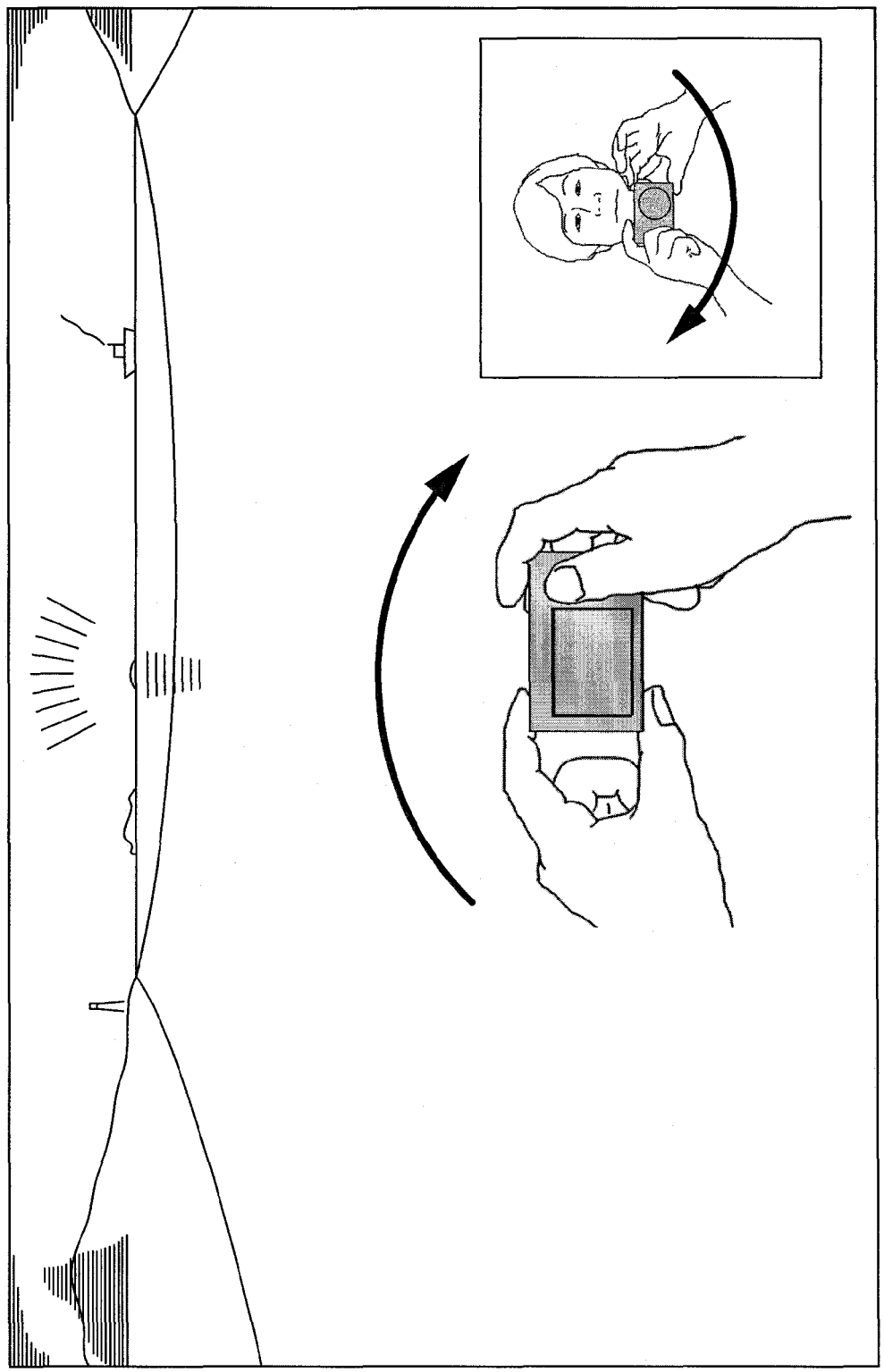
FIG. 2 is a diagram illustrating the concept of panoramic shooting by the digital camera of the present embodiment.

FIG. 2 illustrates an aspect in which a panoramic image that is wide in the lateral direction is shot using the digital camera of the present embodiment. When the photographer pushes the shutter button to shoot images while continuously shifting the angle of the camera, for example, from left to right as the photographer himself rotates, a plurality of images that have overlapping regions are obtained. The image capturing apparatus couples the obtained plurality of images to one another to generate a single panoramic image.

Shooting Operation

The shooting operation in the panorama mode of the digital camera of the present embodiment will now be described with reference to FIGS. 3 and 4.

FIG. 3 illustrates the orientation of the digital camera of the present embodiment and corresponding outputs of the angular velocity sensor 112, where output X denotes the rotational velocities detected in the yaw direction of the camera, output Y denotes the rotational velocities detected in the pitch direction of the camera, and an amount of rotation in each direction can be calculated by obtaining the integral for each direction.

Figure 4:
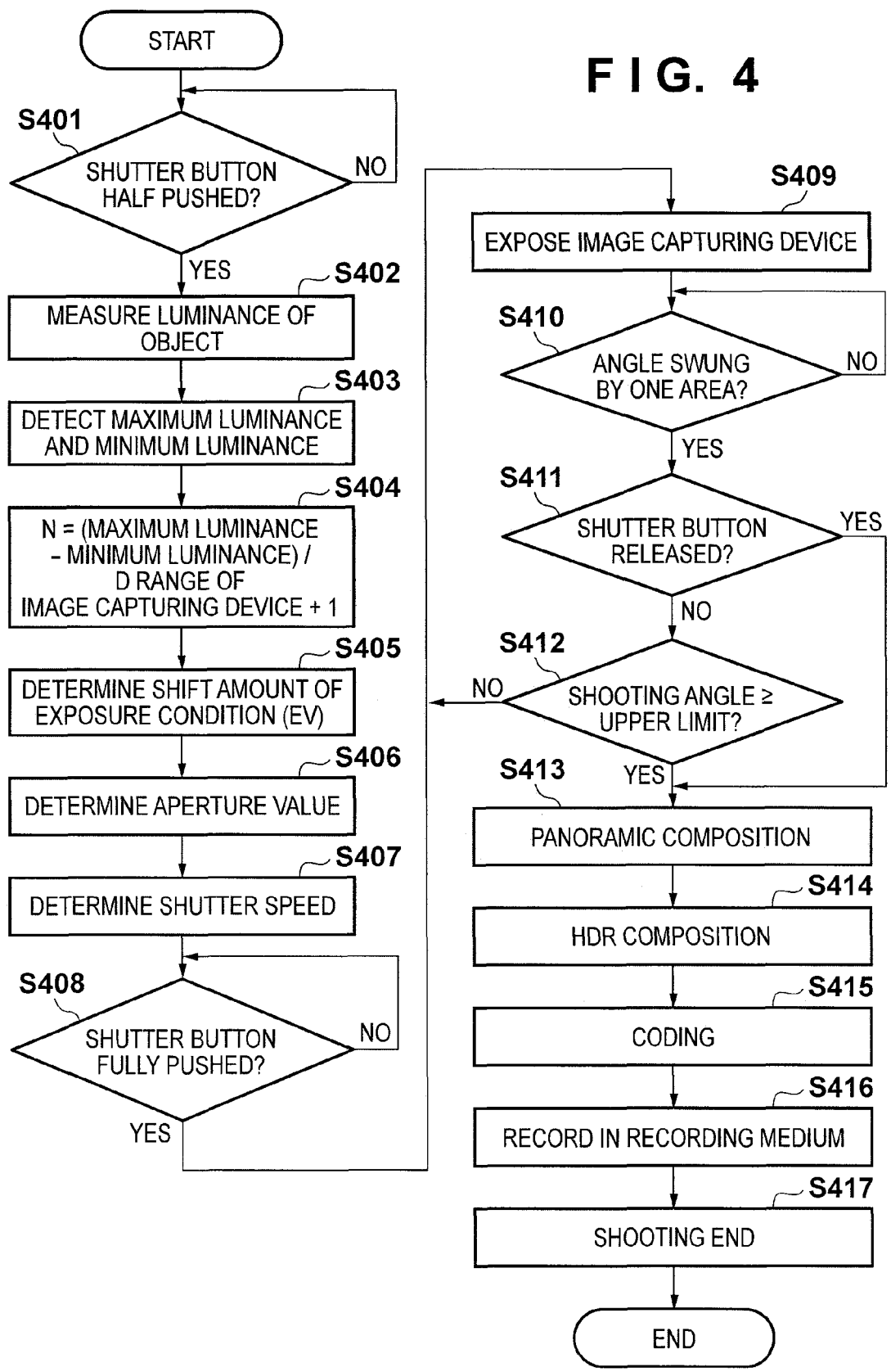
FIG. 4 is a flowchart illustrating a shooting operation in the panorama mode by the digital camera of the present embodiment.

FIG. 4 is the flowchart illustrating the operation in the panorama shooting mode by the digital camera of the present embodiment. Note that the processing in FIG. 4 is realized by the CPU 118 deploying, to the work area of the RAM 117, a control program that is stored in the ROM 119 and executing the control program.

In FIG. 4, the CPU 118 starts the processing when the power of the camera is turned on while the mode switch is set to the panorama mode or when the mode is switched to the panorama mode by the photographer's operation.

First, in step S401, the CPU 118 determines whether the shutter button is half pushed, and if it is determined that the shutter button is half pushed, then, in step S402 the photometric sensor 111 measures the luminance of the object. This photometric sensor, which is of an outside light type and is mounted on the upper side of the camera body and has a luminance measurement range equivalent to the range of angle of view to be shot as a panoramic image, can measure the maximum luminance and the minimum luminance in the measurement range. The photometric sensor is not limited to this, and may be configured to measure the luminance values from captured images that were taken in by the image capturing device 103.

The CPU 118 detects, in step S403, the maximum luminance and the minimum luminance of the object in the shooting range and calculates, in step S404, a required number N of standard dynamic range images that are required for composing an HDR image on the basis of the difference between the maximum and minimum luminance. Note here that the required number N is not limited to a number calculated on the basis of the difference between the maximum and minimum luminance, and may be a number calculated on the basis of the difference, for example, between the luminance that corresponds to an appropriate exposure and the maximum luminance, or between the luminance that corresponds to an appropriate exposure and the minimum luminance, for example. Alternatively, the required number N may be set in advance by a user.

Figure 5:
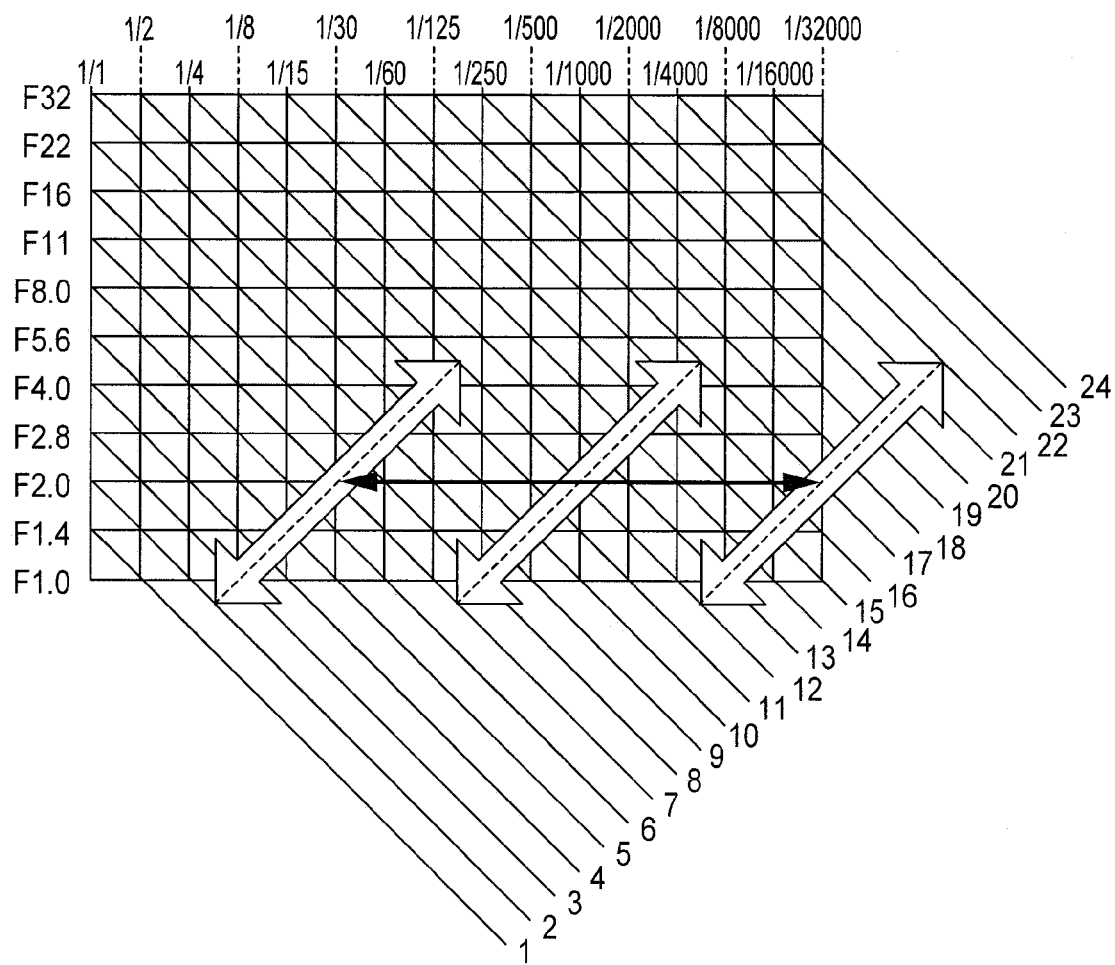
FIG. 5 is a diagram illustrating the concept of how to determine exposure conditions of the digital camera of the present embodiment.

In step S405, the CPU 118 calculates a shift amount of exposure conditions that are of the same number as the required number N but differently set. FIG. 5 is a diagram illustrating the concept of how to determine the required number N and the shift amount of the exposure conditions in steps S404 and S405, respectively. EV stands for Exposure Value and means an amount of light to which a film having a sensitivity of ISO 100 can be exposed so as to be 18% gray (to obtain an appropriate exposure). Assuming that EV=0 when the aperture value is F1.0 and the shutter speed is 1 second, the EV value is incremented by one as the aperture value for a film is multiplied by $\sqrt{2}$ or as the shutter speed (exposure time) is multiplied by ½. The combination of aperture value and shutter speed for the same EV is not limited to one specific combination, and examples of the exposure condition for obtaining an appropriate exposure when the amount of light is 7 EV include F4.0·⅛ second, F2.8·1/16 second, and F2.0·1/30 second (see FIG. 5). Further, the width of a dynamic range is also indicated with an EV value and, for example, a dynamic range of 10 EV indicates a dynamic range that can cover the luminance difference of $2^{10}=1024$ times. The required number N and the shift amount of exposure conditions are calculated by the following formulae:

$$N=((\text{maximum luminance}-\text{minimum luminance})/\text{dynamic range of the image capturing device})+1$$

$$\text{Exposure shift amount}=((\text{maximum luminance}-\text{minimum luminance})-\text{dynamic range of the image capturing device})/(N-1)$$

Assuming that a standard dynamic range of the image capturing device of the present embodiment is 10 EV, if it is determined in step S403 that the maximum luminance is 22 EV and the minimum luminance is 2 EV, then N=3 will be calculated. That is, the required number N is determined depending on the result obtained by dividing the difference between the maximum luminance and the minimum luminance by the dynamic range of the image capturing device. The shift amount of exposure conditions determined in step S405 will result in 5 EV, and the aperture value determined in step S406 will result in F2.0. EV values to be used for the determination of exposure conditions in three areas are also determined: 12 EV is determined for the standard exposure condition; 7 EV is determined for the under-side exposure condition; and 17 EV is determined for the over-side exposure condition.

In steps S406 and S407, the CPU 118 determines an aperture value and shutter speeds, respectively. N shutter speeds are determined with respect to one aperture value because the change of an exposure condition, which is performed when a plurality of standard dynamic range images are obtained, is made by changing the shutter speed. Also, a condition is set under which the best shutter speed is obtained among the limitation of aperture values and shutter speeds that can be set on the camera side.

In view of the above-mentioned conditions, according to the present embodiment, the aperture value is determined to be F2.0, the shutter speeds are determined to be 1/30 second, 1/1000 second, and 1/32000 second. Note here that the image capturing device captures an image with shutter speeds that are differently set for each area of the image capturing device by controlling a charge accumulation time of the image capturing device 103, which will be described later.

In step S408, the CPU 118 determines whether the shutter button is fully pushed, and if it is determined that the shutter button is fully pushed, then in step S409, exposure of the object starts in each area of the image capturing device 103 and ends after a predetermined charge accumulation time has expired, and the image capturing signal is transferred. The transferred image capturing signal is A/D converted by the A/D converter 104, and subjected to image processing, such as gamma correction, white balance correction, and noise reduction processing, by the image processing unit 105 and then temporally stored in the first SDRAM 109.

In step S410, the CPU 118 determines whether the photographer has swung the shooting angle by 10 degrees in a horizontal direction, which is a composition unit for a panoramic composition, and if it is determined that the photographer has swung the shooting angle by 10 degrees, then the CPU 118 determines in step S411 whether the photographer released the shutter button. If it is determined in step S411 that the photographer did not release the shutter button and the shutter button is continued to be pushed, the processing advances to step S412. In step S412, the CPU 118 determines whether the amount of swing of the shooting angle that was made by the photographer after the start of the shooting exceeds 270 degrees, which is the largest angle of view that can be shot in the panorama mode according to the present embodiment, and if it is determined that the amount of swing does not exceed 270 degrees, the processing returns to step S409.

If it is determined in step S411 that the photographer has released the shutter button or in step S412 that the amount of swing of the shooting angle that was made by the photographer after the start of the shooting has reached 270 degrees, the image capturing operation ends. That is, in step S413, panoramic image generation processing is performed so as to generate panoramic images, and in step S414 HDR image composition processing is performed so as to generate an ultimate panoramic image that is to be recorded in the recording medium 114.

Subsequently, in step S415, the CPU 118 encodes the panoramic image data generated by the codec 110 into JPEG or RAW data, and in step S416 the encoded panoramic image is recorded in the recording medium 114, and in step S417 a series of operation ends.

Exposure Operation (S409)

Figure 6:
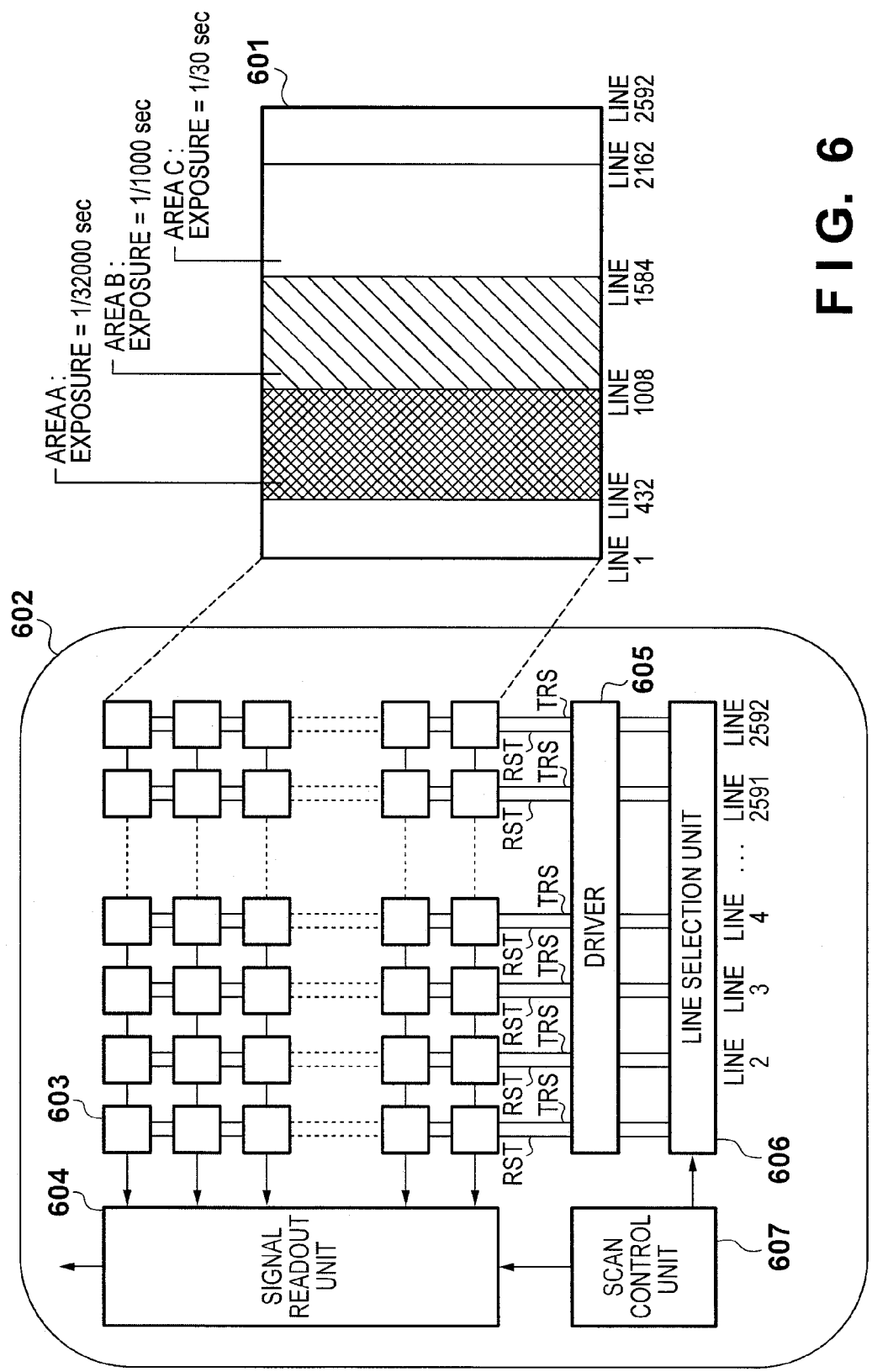
FIG. 6 is a diagram illustrating a configuration of an image capturing device of the digital camera of the present embodiment.

The following describes in detail exposure of the image capturing device performed in step S409 of FIG. 4 with the shutter speeds determined in step S407, with reference to FIG. 6.

The image capturing device of the present embodiment has 2592 lateral pixels×1944 vertical pixels (about 5 Million pixels) in which lines are configured in a vertical direction.

In FIG. 6, reference numeral 601 conceptually denotes the image capturing device, and if N=3, the lines 1 to 431 belong to an invalid area that is exposed to light but not used in the later-described panoramic composition, the lines 432 to 1007 belong to an area A that is exposed to light for a charge accumulation time of $\frac{1}{32000}$ second, the lines 1008 to 1583 belong to an area B that is exposed to light for a charge accumulation time of $\frac{1}{1000}$ second, and the lines 1584 to 2161 belong to an area C that is exposed to light for a charge accumulation time of $\frac{1}{30}$ second. The lines 2162 to 2592 also belong to an invalid area where they are exposed to light but not used in the later-described panoramic composition.

Reference numeral 602 denotes an internal configuration of the image capturing device, reference numeral 603 denotes a light receiving element constituting one pixel, and reference numeral 604 denotes a signal read out unit for reading out, as an image signal, an amount of charge accumulated by the light receiving elements. Reference numeral 605 denotes a driver for controlling operation of the pixels, the driver outputting for each line a RST signal for instructing a timing to release (reset) the charge accumulated by the light receiving elements 603, and a TRS signal for obtaining information about an accumulated charge amount at the time of assertion and instructing a timing to transfer the charge to the signal read out unit 604. Note that the charge accumulation time is a time difference from the assertion of the RST signal to the assertion of the TRS signal, and corresponds to the shutter speed.

Reference numeral 606 denotes a line selection unit that selects a line to be subjected to pixel line control by the driver 605, and reference numeral 607 denotes a scan control unit for controlling the signal read out unit 604 and the line selection unit 606 so as to scan for one screen.

According to the present embodiment, the areas are separated from each other by grouping the lines, which correspond to scan lines of the image capturing device.

Signal Waveform

Figure 7:
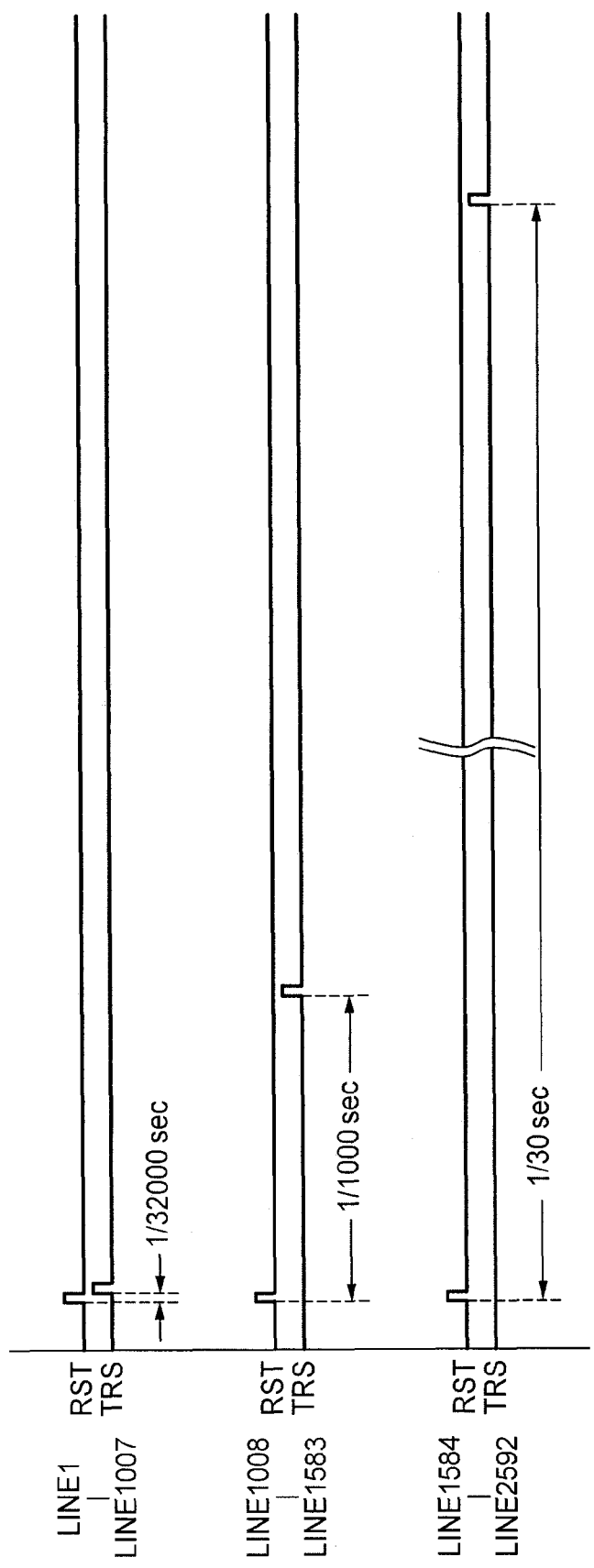
FIG. 7 is a diagram illustrating examples of a control signal of the image capturing device of the digital camera of the present embodiment.

FIG. 7 illustrates waveforms of the RST signal and the TRS signal that are output from the driver 605. In the lines 1 to 1007, the time difference between the rising flanks of the RST signal and the TRS signal is $\frac{1}{32000}$ second. In the lines 1008 to 1583, the time difference between the rising flanks of the RST signal and the TRS signal is $\frac{1}{1000}$ second. In the lines 1584 to 2592, the time difference between the rising flanks of the RST signal and the TRS signal is $\frac{1}{30}$ second. Accordingly, the shutter speeds are controlled so as to be different for each area.

Panoramic Composition and HDR Composition

The following describes the panoramic composition (first composition) performed in step S413 and the HDR composition (second composition) performed in step S414.

Figure 8:
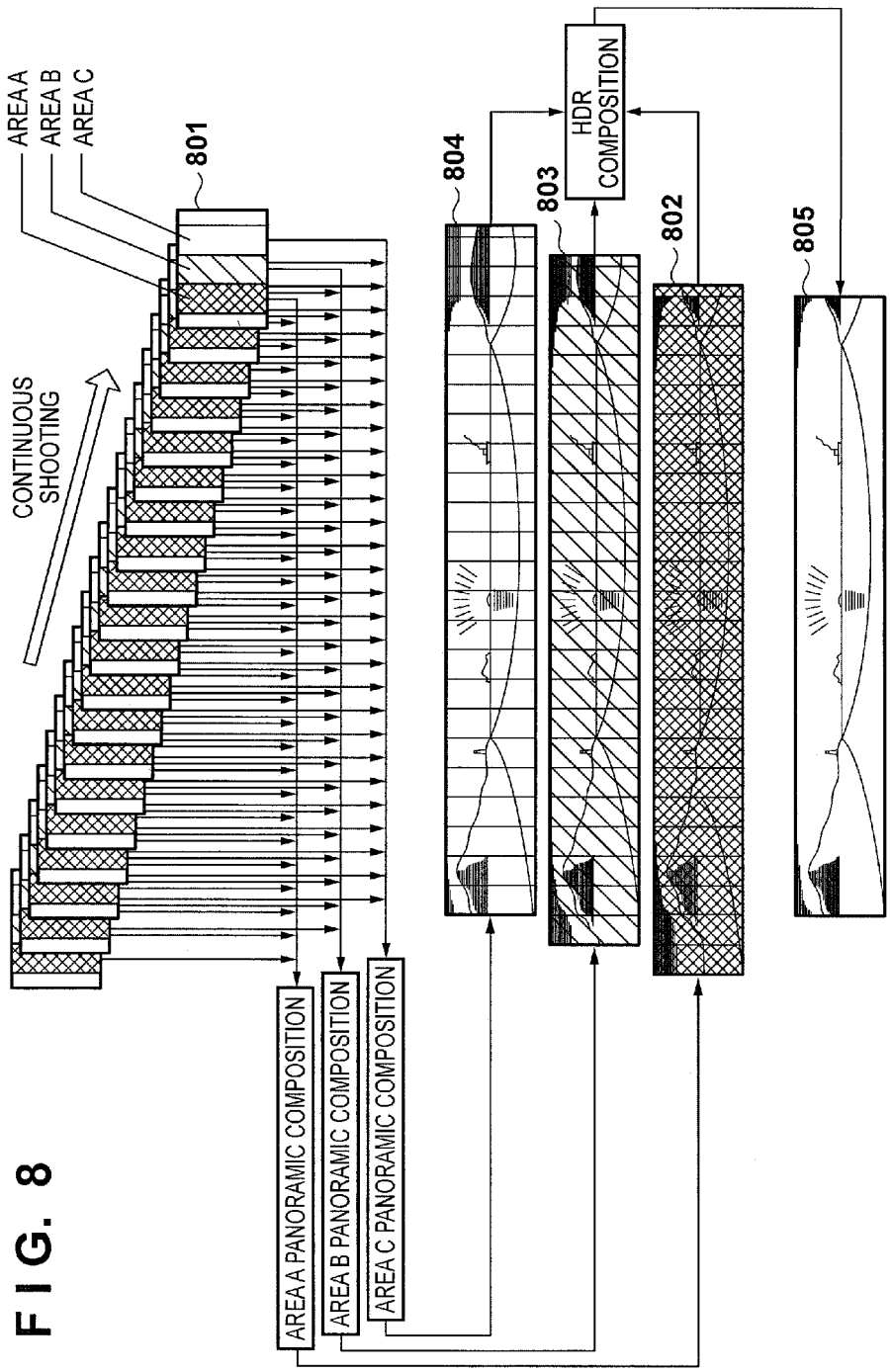
FIG. 8 is a diagram illustrating concepts of panoramic composition and HDR composition of the digital camera of the present embodiment.

FIG. 8 is a diagram illustrating the concept of the panoramic composition and the HDR composition, in which reference numeral 801 denotes the divided areas of the image capturing device, and an image is shot every time the angle is changed by 10 degrees in a horizontal direction so that a total of 29 images are shot by the above-mentioned configuration. Each of the divided areas includes 1944 vertical pixels×576 lateral pixels and has an angle of view of about 15 degrees in a lateral direction since, as described above, the shooting lens 101 has a focal length corresponding to 28 mm in 35 mm film equivalent focal length. Therefore, for each 15 degrees, an image is shot that was captured in each area and has both ends overlapping with other images by 5 degrees. In the panoramic composition, gradation processing such as filtering processing, or the like is performed in order to prevent the border from being noticeable, while utilizing the overlapping portions, and as the result three pairs of panoramic composite images (first composite images) are generated.

Reference numeral 802 denotes a panoramic image obtained by composing images captured in the area A, reference numeral 803 denotes a panoramic image obtained by composing images captured in the area B, and reference numeral 804 denotes a panoramic image obtained by composing images captured in the area C. Each panoramic image is configured with 10 bit gradation.

In the HDR composition performed after the panoramic composition, lightness of the panoramic image 802 obtained by composing the images captured in the area A is first increased by 5 EV, which is an exposure shift amount. Whereas, lightness of the panoramic image 804 obtained by composing the images captured in the area C is reduced by 5 EV, which is an exposure shift amount. Then, the portions that have no highlight-detail loss or no shadow-detail loss are coupled to the panoramic image 803 obtained by composing the images captured in the area B, so that an HDR image (second composite image) is generated, which has a wider gradation than 10 bits. The HDR image is subjected to contrast compression in which the image to be recorded as a JPEG encoded image is rounded to 8 bit gradation or the image to be recorded as a RAW encoded image is rounded to 14 bit gradation, and then to the predetermined image processing and coding that have been described above, so as to be recorded in the recording medium 114.

As has been described above, according to the present embodiment, the light receiving elements of the image capturing device are separated into a plurality of areas that are oriented in a direction in which the angle is shifted, and for each area an exposure condition of the image capturing device is determined. And, the plurality of images, which are captured, while continuously shifting an angle, by the image capturing device under the exposure condition determined for each area, are coupled to one another with respect to each area, so that a plurality of panoramic images are generated. Further, the plurality of panoramic images that are generated is composed so that a single panoramic image having an extended dynamic range is generated. With these measures, it is possible to shoot, by the same operation as that of the conventional panoramic shooting, a panoramic image having a wide dynamic range in which no difference in brightness level is made at the border between images.

Figure 9:
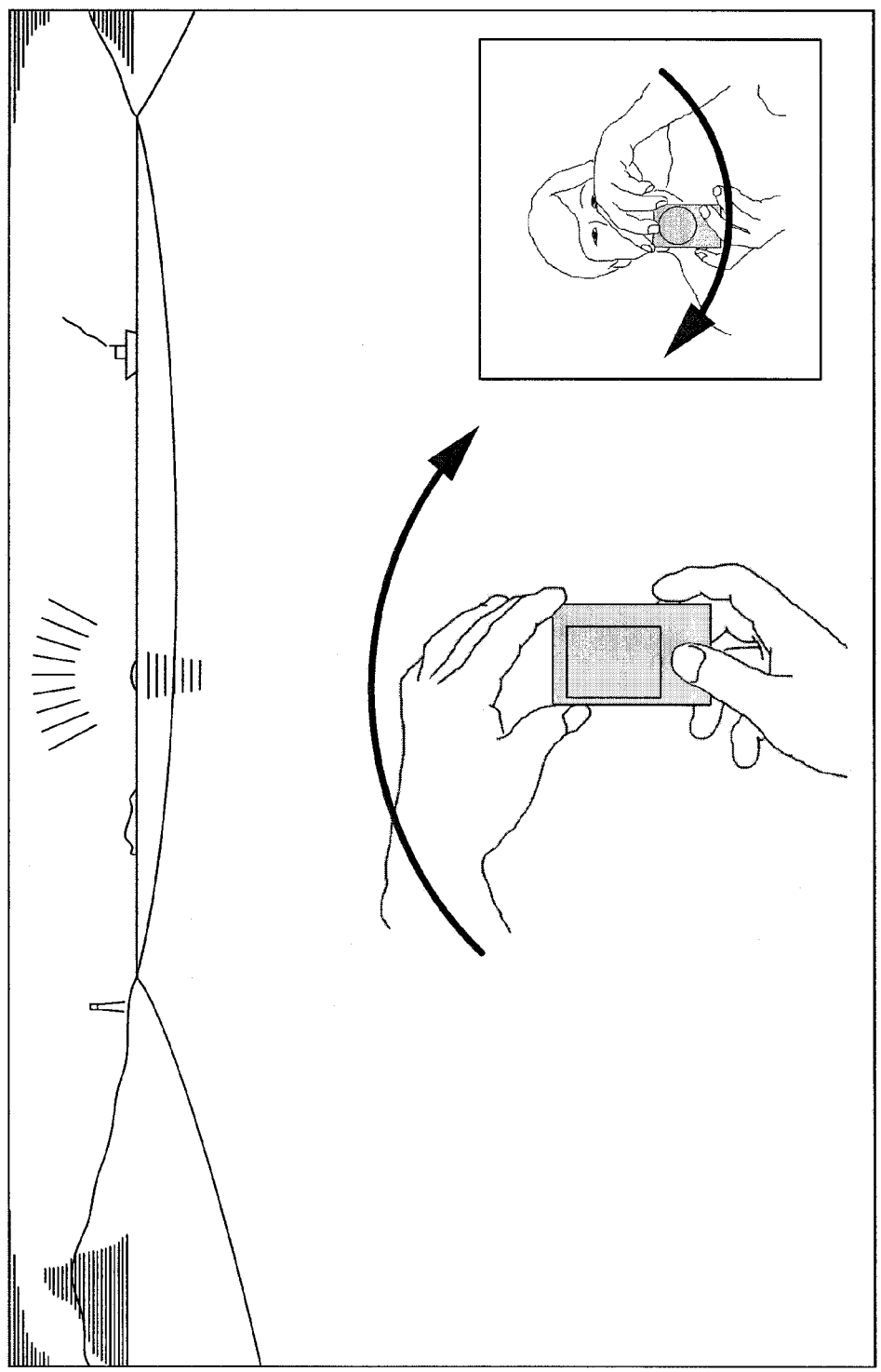
FIG. 9 is a diagram illustrating the concept of panoramic shooting of the digital camera of the present embodiment.
Figure 10:
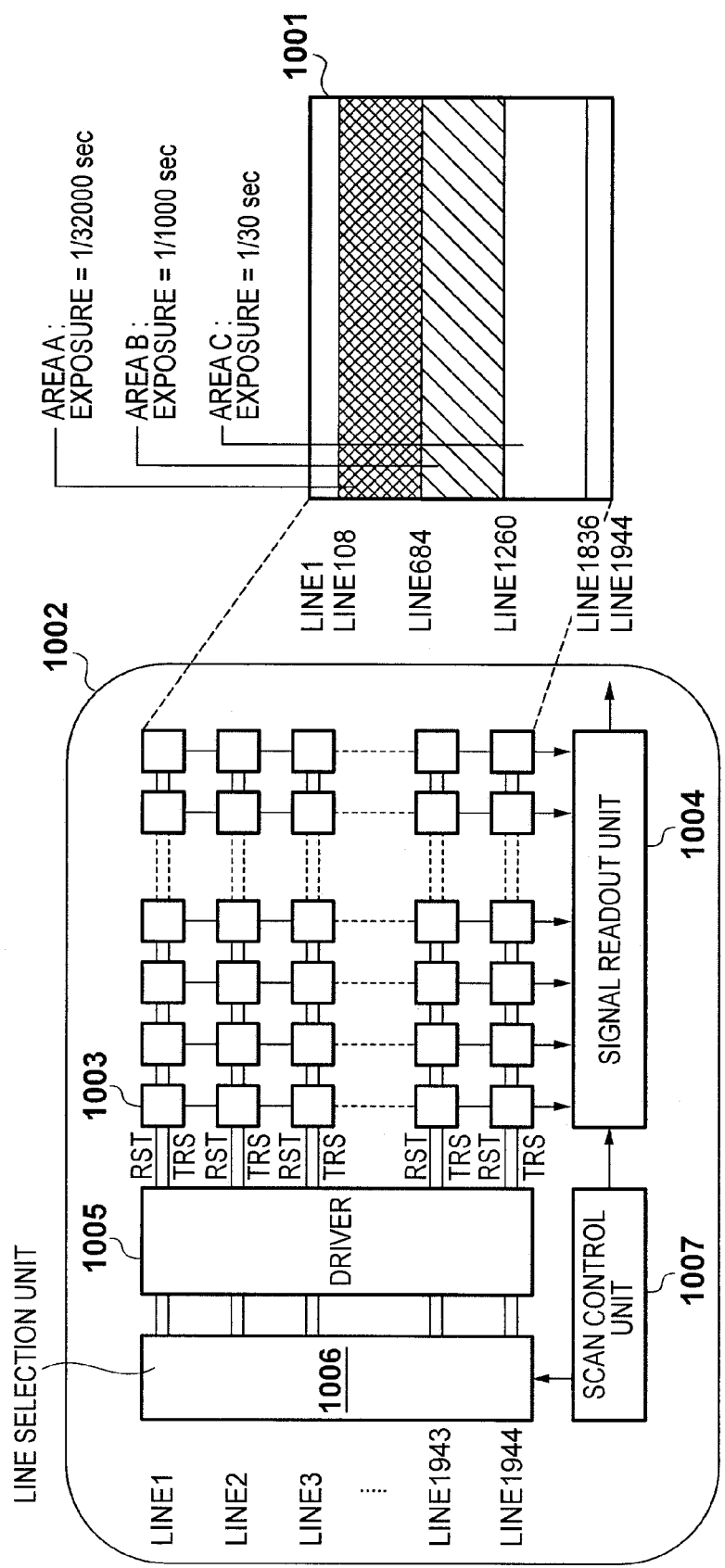
FIG. 10 is a diagram illustrating a configuration of an image capturing device of the digital camera of the present embodiment.

Although the digital camera of the present embodiment employs an image capturing device in which the lines are aligned in a vertical direction as illustrated in FIG. 6, a digital camera in which the lines are aligned in a lateral direction as illustrated in FIG. 10 may be used. Note that, in an internal configuration 1002 of the image capturing device 1001 illustrated in FIG. 10, reference numerals 1003 to 1007 respectively have the functionalities equivalent to those of the light receiving element 603, the signal read out unit 604, the driver 605, the line selection unit 606, and the scan control unit 607 in FIG. 6. When panoramic shooting is performed in the lateral direction using the image capturing device in which the lines are aligned in a lateral direction, the photographer can swing an angle in the lateral direction while holding the camera in the vertical position (see FIG. 9). This allows the use of a general image capturing device in which the lines are aligned in a lateral direction, and an effect that a panoramic image having extended angles of view in upward and downward directions is achieved.

Figure 11:
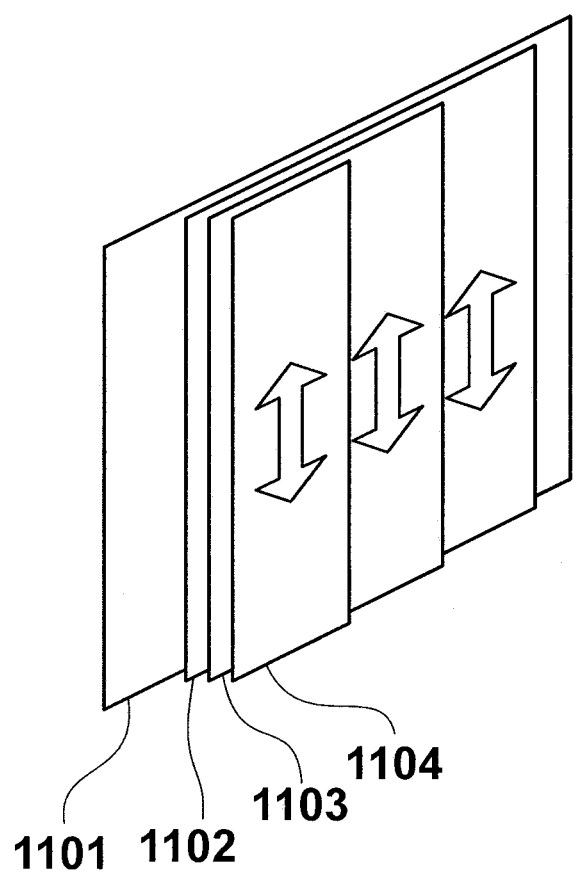
FIG. 11 is a diagram illustrating a configuration of the image capturing device of the digital camera of the present embodiment.

Further, according to the present embodiment, although different exposure conditions are set for each area of the image capturing device by varying the charge accumulation time, it is also possible to set exposure conditions by providing, upstream the image capturing device 103, movable neutral density filters 1102 to 1104 as illustrated in FIG. 11, and varying amounts of light to reach the areas depending on densities or the number of the neutral density filters. Alternatively, it is also possible to set exposure conditions by changing the width or gain of each area. This makes it possible to select a same shutter speed for an image capturing device, so that the photographer will be given a lot of options for selection of a shutter speed because the shutter speed is hardly limited by aperture values and shutter speeds, which can be set on the camera side.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-037799, filed Feb. 23, 2012, which is hereby incorporated by reference herein in its entirety.

What is claimed is:

1. An image capturing apparatus comprising:
   an image capturing device configured to capture images of an object; and
   a processor implementing the functions of a determination unit, a first composition unit and a second composition unit, wherein,
   the determination unit is configured to divide light receiving portions of the image capturing device into a plurality of areas and determine an exposure condition for each of the plurality of areas;
   the first composition unit is configured to couple each of the plurality of areas using a plurality of images obtained by continuously shooting of the image capturing device while changing a shooting angle and generate a plurality of first panoramic images; and
   the second composition unit is configured to compose the plurality of first panoramic images and generate a single second panoramic image that has an extended dynamic range.

2. The apparatus according to claim 1, further comprising:
   a photometric sensor configured to measure luminances of the object;
   wherein the determination unit is configured to detect a difference between maximum luminance and minimum luminance of a shooting range from the luminances of the object obtained by the photometric sensor, and to determine the number of the areas depending on the result obtained by dividing the detected difference in luminance by a dynamic range of the image capturing device.

3. The apparatus according to claim 1,
   wherein the exposure condition is determined depending on an aperture value of a stop for limiting an amount of light that enters the image capturing device, and a charge accumulation time of the image capturing device, and
   the determination unit sets exposure conditions that are different for each area by varying the charge accumulation time.

4. The apparatus according to claim 3,
   wherein the areas are separated from each other by grouping lines that correspond to scan lines of the image capturing device.

5. The apparatus according to claim 1,
   wherein movable neutral density filters are provided in locations that correspond to the areas of the light receiving portions of the image capturing device, and the determination unit is configured to set the exposure conditions by varying amounts of light that reaches the areas depending on densities or the number of the neutral density filters.

6. A control method of an image capturing apparatus comprising an image capturing device for capturing images of an object, the method comprising:
   dividing light receiving portions of the image capturing device into a plurality of areas;
   determining an exposure condition for each of the plurality of areas;
   coupling each of the plurality of areas using a plurality of images obtained by continuously shooting of the image capturing device while changing a shooting angle and generating a plurality of first panoramic images; and
   composing the plurality of first panoramic images and generating a single second panoramic image that has an extended dynamic range.

7. A non-transitory computer-readable storage medium storing a program for causing a computer to execute a control method of an image capturing apparatus comprising an image capturing device for capturing images of an object, the method comprising:
   dividing light receiving portions of the image capturing device into a plurality of areas;
   determining an exposure condition for each of the plurality of areas;
   coupling each of the plurality of areas using a plurality of images obtained by continuously shooting of the image capturing device while changing a shooting angle and generating a plurality of first panoramic images; and composing the plurality of first panoramic images and generating a single second panoramic image that has an extended dynamic range.

8. The apparatus according to claim 1,
wherein the determination unit divides the light receiving portions of the image capturing device such that the plurality of areas are oriented in a direction in which the shooting angle is changed.

* * * * *